US007793255B1

(12) United States Patent
Kawaguchi et al.

(10) Patent No.: US 7,793,255 B1
(45) Date of Patent: Sep. 7, 2010

(54) SYSTEM AND METHOD FOR MAINTAINING ALTERNATE OBJECT VIEWS

(75) Inventors: Kohsuke Kawaguchi, San Jose, CA (US); Joseph M. Fialli, Reading, MA (US); Ryan C. Shoemaker, Acton, MA (US)

(73) Assignee: Oracle America, Inc., Redwood City, CA (US)

( * ) Notice: Subject to any disclaimer, the term of this patent is extended or adjusted under 35 U.S.C. 154(b) by 1590 days.

(21) Appl. No.: 11/069,609

(22) Filed: Mar. 1, 2005

(51) Int. Cl.
*G06F 9/44* (2006.01)
*G06F 9/445* (2006.01)

(52) U.S. Cl. .................. 717/100; 717/120; 717/140

(58) Field of Classification Search ......... 717/100–103, 717/106–109, 118, 140–143, 148, 120–122
See application file for complete search history.

(56) References Cited

U.S. PATENT DOCUMENTS

| | | | | |
|---|---|---|---|---|
| 5,339,433 | A * | 8/1994 | Frid-Nielsen ............... | 717/141 |
| 6,018,627 | A * | 1/2000 | Iyengar et al. .............. | 717/103 |
| 6,434,739 | B1 * | 8/2002 | Branson et al. ............. | 717/108 |
| 6,519,764 | B1 * | 2/2003 | Atkinson et al. ............ | 717/120 |
| 6,658,660 | B1 * | 12/2003 | Minyard ..................... | 717/171 |
| 6,868,538 | B1 * | 3/2005 | Nixon et al. ................ | 717/100 |
| 6,944,846 | B2 * | 9/2005 | Ryzhov ...................... | 717/116 |
| 6,959,415 | B1 * | 10/2005 | Soderberg et al. .......... | 715/234 |
| 7,000,219 | B2 * | 2/2006 | Barrett et al. ............... | 717/107 |
| 7,127,700 | B2 * | 10/2006 | Large ......................... | 717/100 |
| 7,137,100 | B2 * | 11/2006 | Iborra et al. ................ | 717/106 |
| 7,152,090 | B2 * | 12/2006 | Amirisetty et al. .......... | 709/200 |
| 7,272,815 | B1 * | 9/2007 | Eldridge et al. ............. | 717/101 |
| 7,275,079 | B2 * | 9/2007 | Brodsky et al. ............. | 709/203 |
| 7,322,025 | B2 * | 1/2008 | Reddy et al. ................ | 717/121 |
| 7,383,534 | B1 * | 6/2008 | Agbabian et al. ........... | 717/120 |
| 7,386,835 | B1 * | 6/2008 | Desai et al. ................. | 717/117 |
| 7,426,721 | B1 * | 9/2008 | Saulpaugh et al. .......... | 717/144 |
| 7,451,432 | B2 * | 11/2008 | Shukla et al. ............... | 717/106 |
| 7,454,743 | B2 * | 11/2008 | Fuchs ......................... | 717/108 |
| 7,458,082 | B1 * | 11/2008 | Slaughter et al. ............ | 719/328 |
| 7,464,366 | B2 * | 12/2008 | Shukla et al. ............... | 717/100 |

(Continued)

OTHER PUBLICATIONS

Aoyama et al, "Development of XML based software and service commerce language XSCL and JavaBeans Players", IEEE, pp. 228-233, 2000.*

(Continued)

*Primary Examiner*—Anil Khatri
(74) *Attorney, Agent, or Firm*—Brooks Kushman P.C.

(57) ABSTRACT

A binding framework including a binder operable to associate and synchronize particular document objects with corresponding content objects performs unmarshalling to create the content objects from the XML documents. The content objects, which may in particular configurations be JAXB content objects, provide an alternate view to the XML data contained in the underlying XML documents. Java (i.e. user) applications then modify, or update the content objects via the alternate view, and rewrite, or update, the corresponding XML document during a marshalling process (i.e. writing the data from Java back into XML). The binding framework maintains the associations such that bound content objects are modifiable and may update the corresponding XML data in a non-destructive manner which avoids overwriting or "clobbering" other preexisting data contained in the XML document object during marshalling. The synchronizer employs the associations to maintain runtime consistency between the XML, or DOM view and the Java, or JAXB view.

15 Claims, 8 Drawing Sheets

U.S. PATENT DOCUMENTS 7,509,633 B2 * 3/2009 Nesbitt et al. ............... 717/140

OTHER PUBLICATIONS

Terwilliger et al, "Full fidelity flexible object oriented XML access", ACM VLDB, pp. 1030-1041, 2009.*

Saini et al, "Language support for distributed proxies", ACM DO21, pp. 1-5, 2009.*

Carpenter et al, "Object serialization for marsshalling data in a Java interface to MPI", ACM Java, pp. 66-71, 1999.*

* cited by examiner

SYSTEM AND METHOD FOR MAINTAINING ALTERNATE OBJECT VIEWS

BACKGROUND OF THE INVENTION

In a software development environment, software developers typically employ different languages, interfaces and development toolkits. Such development elements allow integration of software objects based on or developed under the various elements to effectively interoperate and build the specified system or application. In a large system or application, there may be many developers, each developing software objects, or classes, under a particular language or platform, and many preexisting software objects which are integrated or interfaced via a toolkit or Application Programming Interface (API).

Accordingly, in a modern software development environment, many software objects interoperate in the development environment, and a build mechanism compiles, interprets, or otherwise processes the software objects into executable entities such as user applications. Unlike traditional development, where interoperability and integration between dissimilar development platforms often became sufficiently convoluted so as to encourage the development of homogenous systems, modern software development efforts typically incorporate development tools which strive to create interoperable software objects. Such modern systems strive to insulate developers from intricacies of code level interfaces and discrepancies. For example, the JAVA® language, developed by SUN Microsystems® of Palo Alto, Calif., strives to present an operating system independent data definition language. Further extensions abstract data types and interface parameter passing, ideally relieving the developer from the burden of such technical and implementation specific details. Therefore, software developers may concentrate on the logic, decision paths, and information flows performed by software systems, and avoid excessive distractions of technical implementation details which are instead handled by the compiler, interpreter, or runtime engine.

SUMMARY

In a modern software development environment, there tends to be an ongoing conflict between ease of use and function robustness. Development tools and languages which are intuitively less complex tend to have fewer features available to implement. Conversely, robust software development packages having powerful options and adaptability tend to be complicated to learn. Commercially successful and/or popular development platforms and languages tend to be those which have struck a near optimal balance between ease of use and richness of capabilities. One such language is the Extensible Markup Language (XML), which has been enjoying substantial popularity in the software development community as a means of expressing information and data in a readily transportable, easily processable, and OS (operating system) independent manner.

A typical XML implementation relies heavily on a programmatic interface to access and modify XML data, or documents, known as a document object model (DOM). An XML document is structured data that follows XML syntax. Further, a schema may exist that constrains the structure of the XML document, discussed further below. The DOM is a programmatic interface for accessing XML documents in memory. Accordingly, it is a representation of the XML data that is more appropriate for use when developing software that needs access to the data. Instead of reading the XML document as raw text, the DOM is capable of reading the data into a memory structure that matches the structure of the data itself. It then provides general operations that allow programs to traverse, access, modify, etc, the data in the DOM.

Further, XML data often corresponds to a schema. Each of the schemas defines the structure of a particular type of XML document. While DOM based data is not required to be schema compliant, it is often beneficial to employ such a schema for consistency. However, the XML format presented by the schema may not be particularly intuitive to the task at hand. Such schemas identify syntactical labels known as tags and attributes, each of which receives a particular value in the resulting document. Therefore, while the DOM may accept any well formed XML document whether schema compliant or nor, the flexibility of the DOM may be usurped when confining development to a particular schema. Accordingly, developers working with XML may tend to find it not particularly self documenting, and modifying and/or developing new code may appear somewhat cryptic. Paradoxically, the benefits of XML provided by the definitive structure and parseability of the raw XML code may not serve to identify or document the task for which it is employed.

It would be beneficial to identify an alternate, more intuitive view of XML objects (i.e. data) than the DOM provides. As indicated above, an XML document may or may not be governed by an XML schema. In either case, as long as the XML is well-formed, it can be parsed into a DOM. Given a schema that defines the structure of the XML data, it may be possible to generate a better set of interfaces than what a generic DOM provides. For example, consider a schema that defines purchase order elements with child elements for price, description, quantity, etc. Rather than use a generic DOM, it is possible to generate interfaces with intuitive operations like "getPurchaseOrder", "getPrice", etc. . . . ". Accordingly, the resulting code is more intuitive and self documenting, thereby facilitating development efforts by relieving the developer from interpreting and understanding raw XML element and attributes.

One such alternate view is provided by the Java Architecture for XML Binding (JAXB™), also developed by SUN Microsystems®, which generates Java classes from XML schemas. Accordingly, JAXB provides an alternative to the DOM which is capable of representing the structured data contained in an XML document as structured data in memory. The difference between the two is that DOM is a single generic interface that can be used to read in any well-formed XML document while JAXB generates a custom intuitive interface from the XML schema. A JAXB processor accepts XML schemas and generates corresponding Java classes and interfaces for use from a user application. A novice user unfamiliar with XML may employ the JAXB processor to generate alternate views of XML documents as Java objects. The generated Java classes and interfaces reflect the rules (semantics) of the source XML schema, and are combined with utility packages for manipulating the generated classes and interfaces (code) as a development framework. This development framework allows Java code to interface with XML schema compliant data. Accordingly, developers may employ known Java tools and development techniques for applications developed under DOM based XML data. JAXB facilitates the task of Java developers unfamiliar with the schemas to learn the generated interfaces and use them. Such generated interfaces are more intuitive for Java developers than generic DOM, which tends to be highly focused on XML syntax and notation. Therefore, developers need not be well versed in XML, DOM and associated packages such as the SAX parser in order to develop applications conversant with native XML data.

However, the alternate views provided by the above described conventional JAXB architecture imposes several trade-offs. The JAXB view may not be capable of absolutely representing all features and characteristics of the corresponding XML document, whereas the DOM representation is. Configurations of the invention describe a technique where advanced users of JAXB (people that are experts in the field of XML) can have the best of both worlds: intuitive interfaces that mirror the schema AND the full representation of a DOM. Accordingly, particular arrangements discussed further below maintain the JAXB data structures and the DOM synchronized with each other. There may be trade offs to consider when choosing JAXB over DOM: JAXB is intuitive, uses less memory, not capable of representing the XML document fully. DOM is generic, uses more memory, capable of representing the XML document fully.

In further detail, the DOM is a framework capable of representing substantially any well formed XML data in memory. Accordingly, the DOM provides very generic access to the data, however requires a very thorough understanding of the XML being represented. DOM is capable of representing the XML data in entirety—even data that isn't traditionally considered significant (such as white space, comments, etc). DOM is therefore memory intensive and typically incapable of representing anything other than the entire document, such as portions or fragments. In other words, one cannot tell DOM to search for and load a particular portion of the document without significant expertise in the field of XML processing tools.

In contrast, JAXB is a databinding tool that allows incorporation of XML processing in Java applications—it has a processor that is capable of generating the necessary artifacts for associating XML data with Java classes. JAXB also includes a framework that provides two main operations on XML data: 1) unmarshalling, which is the process of reading XML data into Java classes 2) marshalling, which is the process of producing XML data from Java classes. When JAXB is used to process a schema, it generates classes that have intuitive operations, unlike the generic operations provided by DOM. JAXB, however, may not capture and/or represent all aspects of the XML data (consider white space, comments, etc). JAXB is capable of representing portions of documents, and is generally much less memory intensive than DOM. There are some users that require features of both XML views, such as the ease of use afforded by JAXB coupled with the lossless nature of DOM, for example. Furthermore, it is desirable to provide a framework that:

1. allows developers to easily bind portions of the XML document back and forth between DOM and JAXB as needed
2. allow developers to access and update the XML data in either view and synchronize their changes between the two as needed in a lossless fashion
3. allow developers to bind portions of the XML to JAXB while maintaining the rest of the document in a lossless fashion in DOM Configurations of the invention disclosed herein meet the above described needs by providing a binding framework including a binder operable to associate and synchronize particular DOM object, such as an XML document with corresponding Java objects. An unmarshalling operation generates the corresponding Java objects from the XML documents. The Java objects, which may in particular configurations be JAXB content objects, provide an alternate view to the XML data contained in the underlying XML documents. Java applications then modify, or update the content objects via the alternate view, and rewrite, or update, the corresponding XML document during a marshalling process (i.e. writing the data from Java back into XML).

It would be beneficial to develop a binding framework that maintains the associations such that bound Java objects are modifiable and may update the corresponding XML data in a non-destructive manner which avoids overwriting or "clobbering" other preexisting data contained in the XML document object during marshalling. The binder employs the associations to maintain runtime consistency between the DOM view and the Java, or JAXB view. In this manner, the binder provides partial updateable binding by identifying changes made to the XML data via the JAXB alternate view (i.e. from the Java application) and updating, or writing, the modified data only to corresponding XML objects (i.e. documents) based on the DOM view, without rewriting other XML data during the marshalling process. In particular configurations, the binder maintains the association in the other direction as well—changes to the DOM are synchronized back into the JAXB view.

In other words, the DOM, therefore, is a framework that allows you to read in an XML document and represent it in a hierarchy of related objects. The hierarchy of the objects mirrors the hierarchy of the data in the XML document. The DOM and JAXB views, therefore, can be taken as comparable representations of the XML document or "views" of the XML document. Logically, they represent the same data.

Therefore, the generated Java objects derived from the DOM based XML documents occurs as a global so-called unmarshalling operation, creating parallel objects for all XML documents whether they are used or employed by the Java based alternate view or not. Further, the rewrite, or marshalling operation, which replaces the Java objects back into the DOM counterparts occurs unselectively, often overwriting unintended portions of the XML data from which it is based. Accordingly, configurations discussed herein create, or bind, a selected subset of the XML documents to Java (JAXB) counterparts based on the classes of XML documents employed by the alternate view (i.e. Java based code). Further, configurations discussed herein provide updating of the XML documents from the bound content objects (Java objects) with only the Java based updates to avoid "clobbering" (overwriting) preexisting XML data in the bound XML objects accessible via the alternative JAXB view.

Configurations discussed herein, therefore, provide a method of updateable partial binding by creating associations between document objects in a markup language and managed objects in a content tree, in which the document objects correspond to a class hierarchy structure. The method selectively modifies the managed objects, and updates, by traversing the generated associations that identify document objects corresponding to the modified managed objects, in which the updates occur in a lossless manner which preserves unmodified data in the document objects. In particular arrangements, the document objects in the markup language correspond to a first view from an application program, and the managed objects in the content tree correspond to a second view from the same or a different application program. Note that the operations "binding" and "generating" synonymously mean the process by which artifacts are created that allow the runtime framework to associate XML data and Java classes. Typically, there are two cases: 1. compile an XML schema into a set of Java interfaces (this is called "schema to java" or "s2j," as is known in the art) 2. process a set of preexisting java classes and generate annotations and possibly a schema (typically called "Java to Schema" or "j2s").

Binding is therefore a two phase process. At compile-time, the framework generates a class structure of managed objects (JAXB Java classes) corresponding to the XML document structure defined by XML schemas thereby binding the structure of the schema in the JAXB classes. At runtime, the framework provides marshalling and unmarshalling operations which serialize or convert between XML documents and instances of JAXB managed objects thereby binding XML data to Java and vice versa.

Further, a compiler compiles an application programming interface (API) adapted for access by the application program and operable to modify the managed objects. In particular configurations, the method validates the managed objects by comparing the data to the corresponding XML schema. The generated managed objects further define a content tree, in which the content tree has a hierarchical structure derived from the markup definitions (i.e. typically XML schemas). Updating, or marshalling, performs a lossless update of the XML objects from the modified managed objects, in which lossless updating further includes retaining values of unmodified attributes in the XML objects.

In further detail, the configurations disclosed herein maintain parallel synchronized views of object model, such as the exemplary DOM, by identifying markup definitions adapted for synchronous binding via alternate views, and compiling the identified markup definitions to generate alternate classes corresponding to an alternate view. The method unmarshals markup documents corresponding to the markup definitions, in which the markup documents include markup data, and unmarshalling includes creating managed objects representative of the markup documents conforming to a corresponding one of the generated classes. A binder performs binding of the generated managed objects to the corresponding markup documents, in which the binding includes associating managed objects in the generated classes to the markup documents from which the managed objects were generated. A repository, or memory, stores the associations as synchronous views indicative of corresponding markup objects and managed objects, subsequent to modifying the managed object from a user application, in which the user application is operable to process the markup documents and the managed objects of the synchronized alternate classes. The binder then marshals the modified managed objects by identifying, via the associations, updates made to the managed objects, in which the markup objects correspond to the modified managed objects. The binding framework provided by the binder updates the corresponding markup objects with the modified managed objects, in which updating further includes employing the associations for updating changes made by the user application and avoiding modifying existing markup data in the markup objects. Alternatively, as indicated above, the user application can also modify the DOM and the binder will synchronize those changes back to the Java classes.

In particular configurations, unmarshalling further includes creating a content tree of managed objects from the markup documents, the managed objects corresponding to the markup definitions. Identifying the markup objects includes identifying the modified managed objects from the generated managed objects, and mapping, via the associations, markup documents corresponding to the modified managed objects. During marshalling, the binder modifies the mapped markup documents in the DOM with updates made to the modified managed objects.

In other particular configurations, the associations are indicative of updates to the data in the markup documents, in which marshalling further includes modifying data corresponding to the updates and avoiding overwriting data extraneous to the updates in the modified managed objects. In this manner, the markup documents define a first view of data, the managed objects comprise a second view of the data, in which the binding further includes synchronizing updates to the data from at least one of the first view and the second view, such that marshalling further includes creating a markup document consistent with updates from the second view. In exemplary configurations, the markup documents further define an XML content object tree, and associating is indicative of relations between the content tree of managed objects and the objects in the XML content object tree. In the particular exemplary arrangement, the content tree of managed objects is a JAXB content tree, unmarshalled from a DOM based XML document tree.

The invention as disclosed above is described as implemented on a computer having a processor, memory, and interface operable for performing the steps and methods for monitoring and processing events in an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
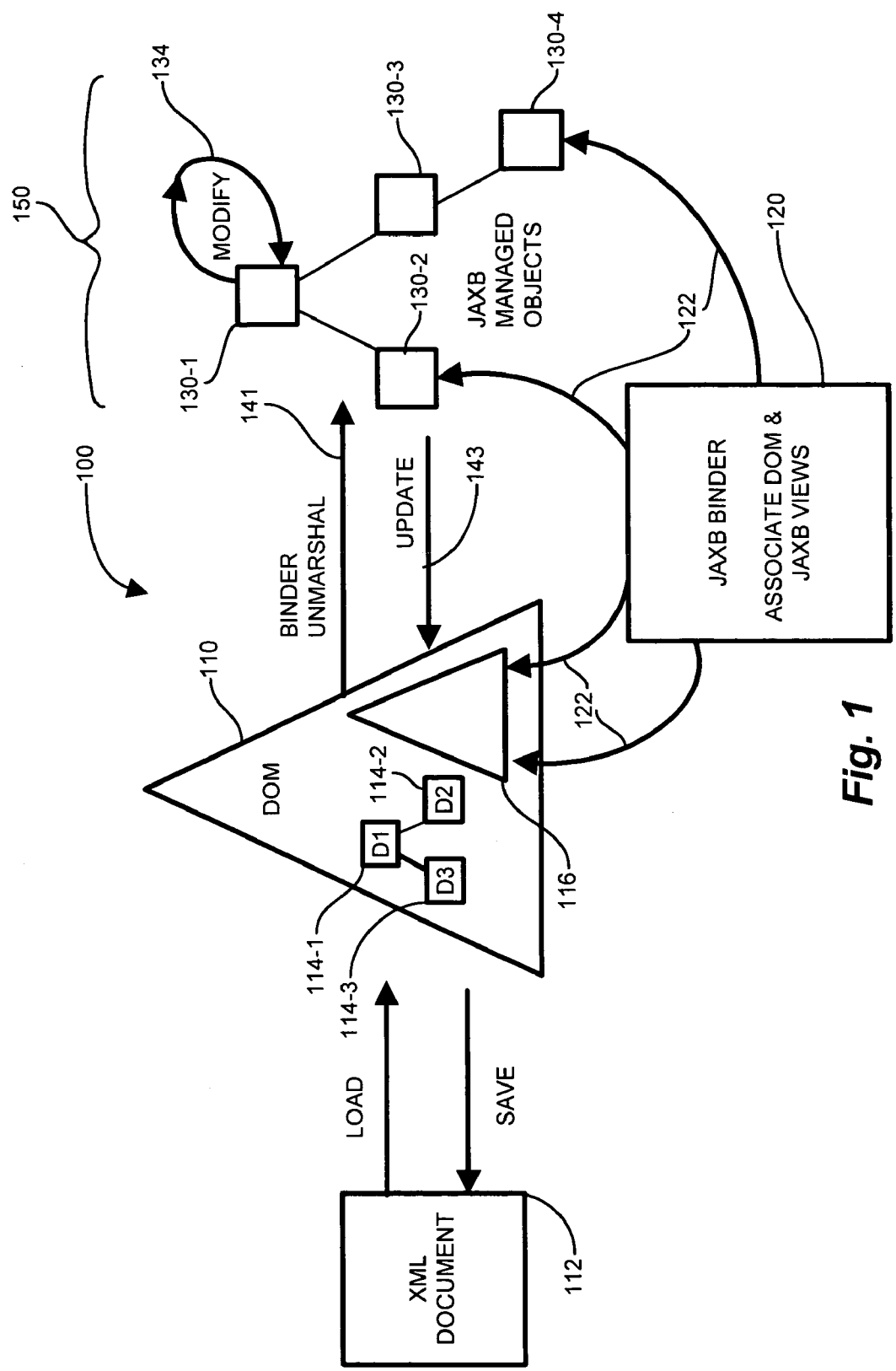
FIG. 1. is a context diagram of the partial binder in a software development environment.

Configurations disclosed herein provide a binding framework including a binder operable to associate and synchronize particular document objects with corresponding content objects. An unmarshalling operation generates the content objects from the XML documents. The content objects, which may in particular configurations be JAXB content objects, provide an alternate view to the XML data contained in the underlying XML documents. Java (i.e. user) applications then modify, or update the content objects via the alternate view, and rewrite, or update, the corresponding XML document during a marshalling process (i.e. writing the data from Java back into XML). The binding framework maintains the associations such that bound content objects are modifiable and may update the corresponding XML data in a nondestructive manner which avoids overwriting other preexisting data contained in the XML document object during marshalling. The synchronizer employs the associations to maintain runtime consistency between the XML document object view and JAXB (Java) view. In this manner, the binder provides partial updateable binding by identifying changes made to the XML data via the JAXB alternate view (i.e. from the Java application) and updating, or writing, the modified data only to corresponding XML objects (i.e. documents) based on the DOM view, without rewriting other XML data during the marshalling process.

Configurations of the invention provide a method of updateable partial binding by creating associations between document objects in a markup language and managed objects in a content tree, in which the document objects correspond to a class hierarchy structure. The method selectively modifies the managed objects, and updates, by traversing the generated associations that identify document objects corresponding to the modified managed objects, in which the updates occur in a lossless manner which preserves unmodified data in the document objects. In particular arrangements, the document objects in the markup language correspond to a first view from an application program, and the managed objects in the content tree correspond to a second view from the same or a different application program. Creating involves unmarshalling the document objects in the markup language to generate the managed objects, in which unmarshalling includes identifying a class structure in a document object model (DOM) having a set of instances of the document objects, and compiling the identified class structure to generate a second class structure (JAXB Java classes) corresponding to the managed objects.

The binding framework also includes a compiler to generate the artifacts to associate the XML data with the Java classes, as discussed above about how the artifacts differ in S2J and J2S. In particular configurations, the compiler compiles an application programming interface (API) for enabling the application program(s) to modify the managed objects. The generated managed objects further define a content tree, in which the content tree has a hierarchical structure derived from the markup definitions (i.e. schemas). Updating, or marshalling, performs a lossless update of the XML objects from the modified managed objects, in which lossless updating further includes retaining values of unmodified attributes in the XML objects.

Figure 2:
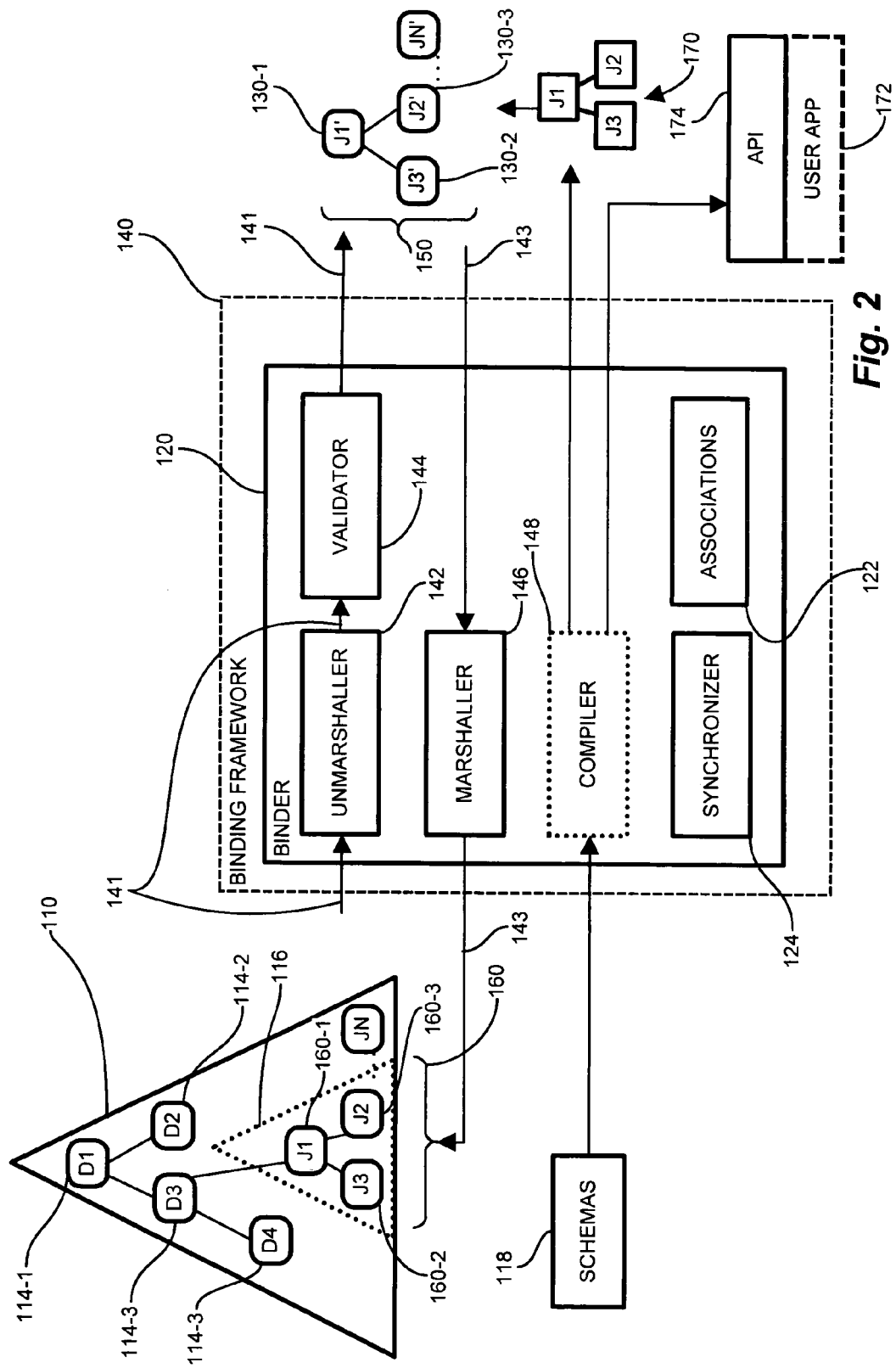
FIG. 2 is a block diagram of the binding framework operable for use with the partial binder of FIG. 1.

FIG. 1 is a context diagram of the partial binder in a software development environment, and FIG. 2 is a block diagram of a binding framework 140 operable for use with the partial binder 120 of FIG. 1. Referring to FIGS. 1 and 2, a software development environment 100 often includes a Document Object Model (DOM) 110 operable for use with the Extensible Markup Language (XML), as is known to those of skill in the art. The DOM 110 is operable to instantiate XML documents 112 for storing XML data, instructions, rules, and other information according to the XML syntax and semantics, which are stored in the DOM 110 as XML documents 114-1 ... 114-3 (114 generally). As discussed above, DOM only requires that the XML document be well formed, and may or may not employ a schema to load an XML document into memory. A partial binder, such as a JAXB binder 120, generates JAXB managed objects 130-1 ... 130-4 corresponding to particular XML documents 112. The binder 120 identifies, in the hierarchical structure of the DOM 110, a selected subset 116 of documents 160-1 ... 160-3 (J1-J3) in the DOM operable for associative view generation via the binder 120 as managed objects 130. The binder 120 unmarshals XML documents 112 corresponding to the subset 116 (i.e. XML document instantiations in the subset 116) into the managed objects 130-1 ... 130-3, collectively forming a content tree 150 which models the hierarchical structure of the source documents 160-1 ... 160-3, which corresponds to the DOM subset 116.

The unmarshalling operation, shown by arrows 141, creates the managed objects 130 by defining a set of associations 122 between the managed objects 130 and the corresponding XML documents in the DOM subtree 116.from which they were derived. In the exemplary configuration, employing JAXB as the binding mechanism in the binding framework 140 (FIG. 2), a schema compiler (FIG. 2, 148, discussed further below) generates a Java code version of the source XML document 114 translating the XML document 114 into a Java (JAXB) object 130, and defines an association between the source XML document 160 and the generated managed object 130 in Java. The Java managed object 130 is an alternate view which may modify itself or other managed objects 130 through execution, shown by operation 134, and which may be manipulated by other user code (not specifically shown). For example, the managed objects 130 are modifiable by a user application 172 based in Java, via an application programming interface (API) 174, or by any suitable software object, shown and discussed further below. Upon successive completion of possibly several operations by the user application 172, the user application 172 requests the binder 120 to update the data contained in the DOM 110 by marshalling, or writing, the managed object 130 back to the corresponding portion of the DOM 116, such as the bound XML document 160, shown by arrow 143. The binder 120 maintains the associations 122 such that only changes made to the managed objects 130 are written to the DOM subset 116, ultimately updating the corresponding XML data in the bound objects 160, thus avoiding undesired changes or overwrites to the XML data stored in the XML documents 112. Conversely, changes made via the user app 172 using DOM APIs may update (i.e. modify) the DOM based view 116 and employ the binder to synchronize changes over to the JAXB view 130, thus illustrating the complementary properties of the dual views (e.g. DOM and JAXB).

FIG. 2 is a block diagram of a binding framework 140 operable for use with the partial binder 120 of FIG. 1. Continuing to referring to FIGS. 1 and 2, the document object model 110 enumerates the subset of the DOM 116 selected for binding, which includes objects (documents) 160. Note that the DOM 110 includes other portions of XML documents 114 as part of the larger document expressed in the DOM 110, of which the binder 120 manages the association of the DOM subset 116 including J1 . . . J3 for marshalling. The XML document objects 160 included in the subset 116 are received by the binder 120 for unmarshalling and marshalling, as now discussed in further detail.

FIG. 2, therefore, may be construed as illustrative of the compile time operations, while FIG. 8, below, depicts the runtime deployment of the objects. The exemplary object structure in the DOM 110 may be expressed in XML syntax as follows:

```
<D1>
    <D3>
        <D4/>
        <J1>
            <J3/>
            <J2/>
        </J1>
    </D3>
    <D2/>
</D1>
```

In operation, the user application 172 or other process selects or identifies the appropriate subset 116 for updateable, partial binding (i.e. unmarshalling). At a previous or concurrent interval, the compiler 148, which may be an external application or operation, receives or identifies the schemas 118 and generates, in the exemplary configuration, Java classes 170 corresponding to the selected XML documents 116. Note that the compiler may be separate from the binding framework 140, generating the Java classes 170 and APIs 174 offline from the binding operation. The compiler 148 may also generates an API 174 corresponding to the generated classes 170 to allow invocation from user code, or the generated classes 170 themselves may simply provide the API. The unmarshaller 142 processes the XML document portion represented by the DOM subtree 116, and creates corresponding content objects 130-1 . . . 130-3 in a content tree 150. A validator 144 may check the unmarshalled objects for type consistency (note that the validator 144 performs an optional validation operation, discussed further below). In the exemplary configuration, the content objects 130 are Java objects and the content tree 150 is a Java content tree, as specified in the corresponding Java class hierarchy 170. During unmarshalling, the binder 120 also creates the associations 122 between each of the Java (JAXB) objects J1', J2', and J3' (150) and corresponding DOM subtree 116. Subsequently, such as at runtime, as will be discussed in further detail below, a user application 172 invokes the generated Java objects 130 via the API 174. The user application 172 may access and modify the unmarshalled objects 130 via the API 174. Following object 130 manipulation from execution of the user application 172, a marshaller 146 receives the objects 130 in the Java content tree 150 and marshals the objects 130 by updating the associated XML objects (documents) 160 as indicated by the associations 122. A synchronizer 124 moderates access and modifications to the multiple views of the objects (130, 116) provided by the DOM 110 and JAXB (Java) bindings, as the user application 172 may attempt to modify either the DOM subtree 116 or the Java object 130, as will be discussed further below. The marshaller 146 completes the update by updating only the changes to the DOM subtree 116 made via the JAXB view of the objects 130, thereby proceeding in a nondestructive, or lossless manner.

Figure 3:
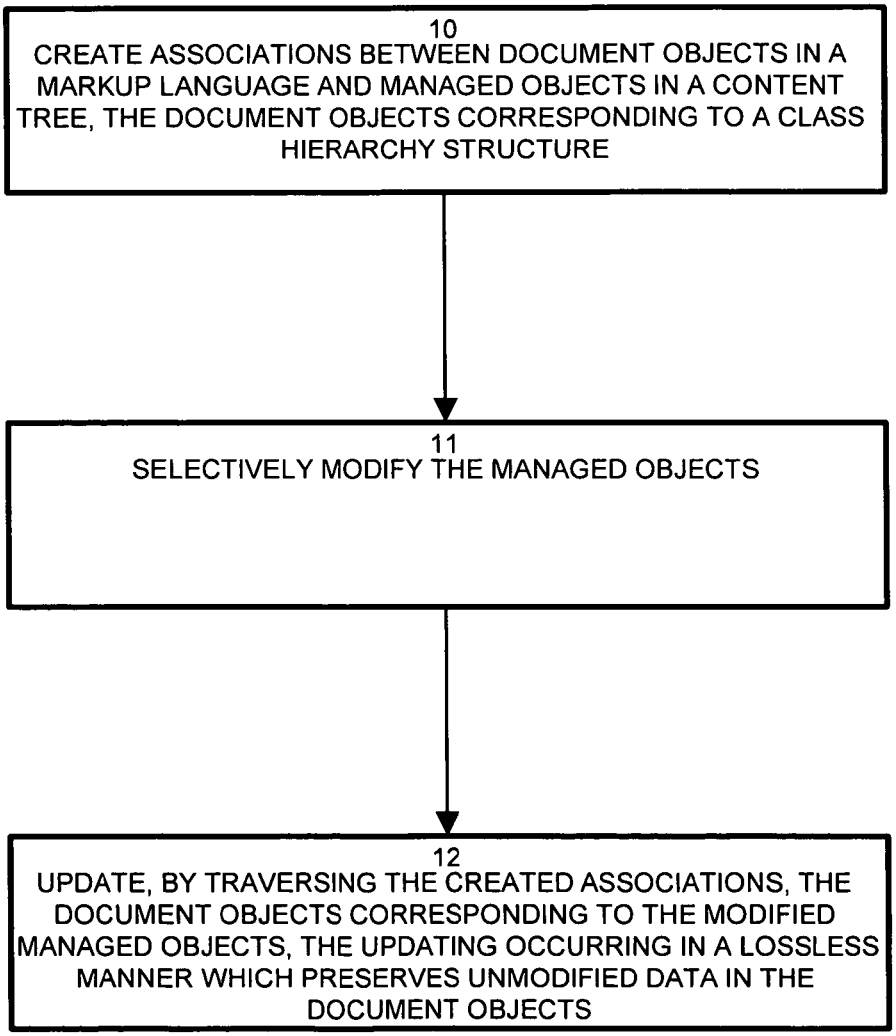
FIG. 3 is a flowchart of partial binding updates in the framework of FIG. 2.

FIG. 3 is a flowchart of partial binding updates in the framework of FIG. 2. Referring to FIGS. 1-3, the method of updateable partial binding as disclosed herein includes creating associations 122 between document objects 160 in a markup language and managed objects 130 in a content tree 150, in which the document objects correspond to a class hierarchy structure such as exhibited by the DOM 110, as depicted at step 10. The unmarshalling process, discussed further below, creates, or instantiates the Java based JAXB objects 130 from XML documents (objects) in an unmarshalling operation. The JAXB objects 130 in the Java content tree 150 represent the unmarshalled XML documents 160 from the DOM 110 view. The binder 120 also identifies and saves the associations 122 between the counterpart XML documents 160 and the generated JAXB objects 130.

A software entity, such as a user application 172, selectively modifies the managed objects 130, as shown at step 11. The software entity, such as a user application 172, causes the binder 120 to update, by traversing the generated associations 122, the DOM subtree 116 corresponding to the modified managed objects 130, in which the updating occurs in a lossless manner which preserves unmodified data in the document objects 160 (i.e. XML documents 160), as depicted at step 12. Such updating and synchronizing of the bound objects typically occurs in response to an explicit request from the user code (i.e. client application) to synchronize the two views, however alternate configurations may automate this approach. This so-called marshalling operation employs the associations 122 for tracking the changes made to the bound JAXB objects 130 back to the DOM subtree 116 (i.e. DOM based versions 160) and ultimately back to the raw source XML documents 112 (recall that while configurations discussed herein employ DOM compliant objects 160, raw XML need not be DOM based). In this manner, code written against the JAXB objects 130 and interface 174 provide a second view to the XML data which may losslessly update the XML data via the binding between the multiple views.

Note that the exemplary marshalling and unmarshalling operations employ the JAXB conversant binder 120 for creating Java objects 130 from corresponding XML. However the marshalling and unmarshalling operations may employ alternate languages from which to generate an alternate view of the XML data stored in the XML documents 112.

Figure 4:
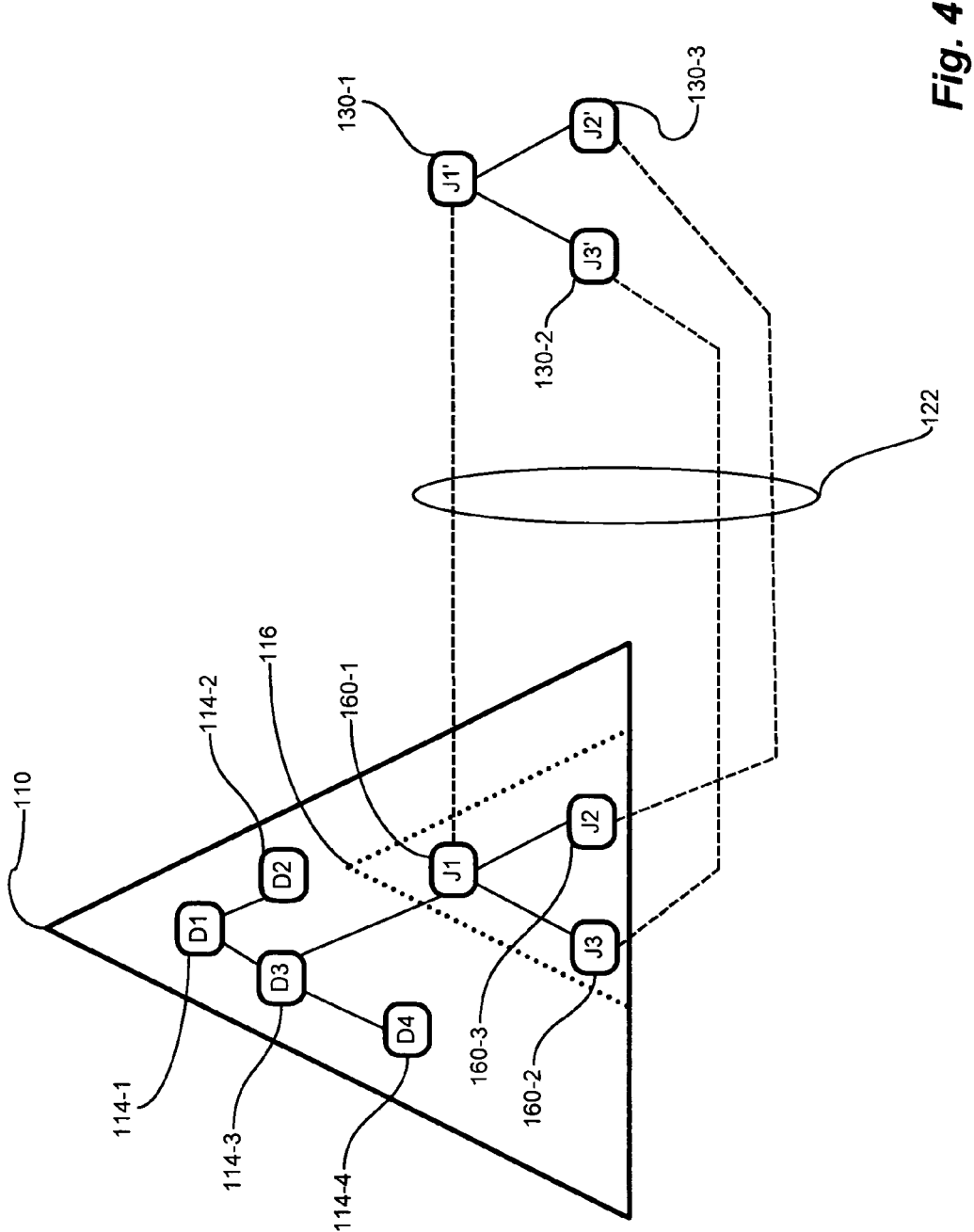
FIG. 4 is a diagram of associations between bound objects in the environment of FIGS. 1 and 2.

FIG. 4 is a diagram of associations 122 between bound objects in the environment of FIGS. 1 and 2. Referring to FIGS. 2 and 4, the XML (DOM based) object tree 110 shows instantiated objects in the hierarchical structure exhibited by the DOM 110. Objects 160-1.160-3 in the subset 116 objects (J1', J2' and J3') have alternative view counterparts 130-1 . . . 130-3, represented in the exemplary configuration as JAXB objects in the content tree 150, indicated by the associations 122. Accordingly, modifications to the JAXB content tree 150 objects 130 are marshaled back into the DOM subtree 116 by updating the corresponding objects as indicated by the associations 122. Marshalling via the associations 122 produces a lossless update by updating, or overwriting, only changed data in the counterpart object 160. The remaining portions of the DOM 114 which have not been associated with the Java object representation 130 are left intact and unaffected by the synchronization, hence they have no alternate view expressed as JAXB objects 130.

Figure 5:
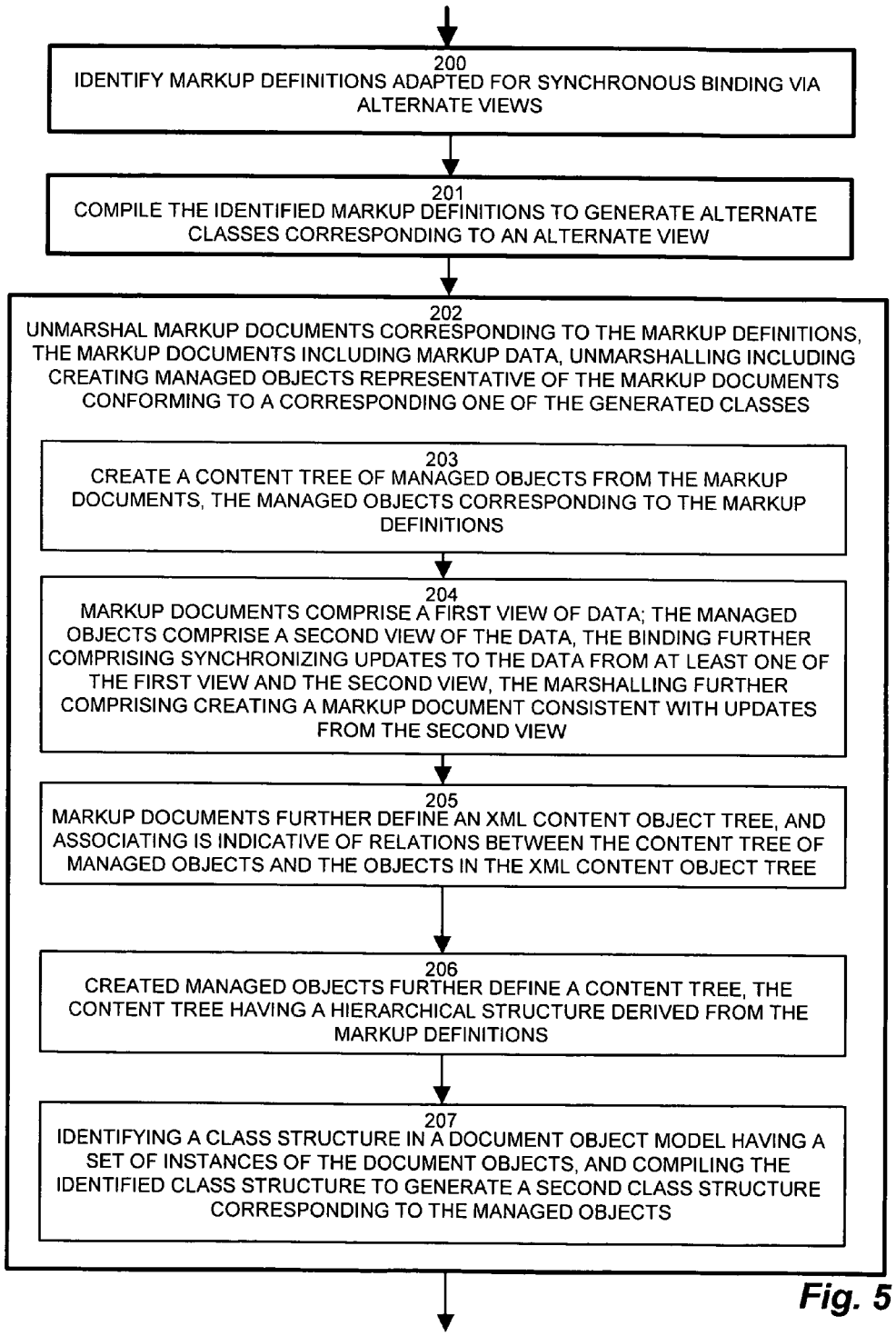
FIGS. 5-7 are a flowchart of object development using the associations of FIG. 4 in the framework of FIG. 2.
Figure 6:
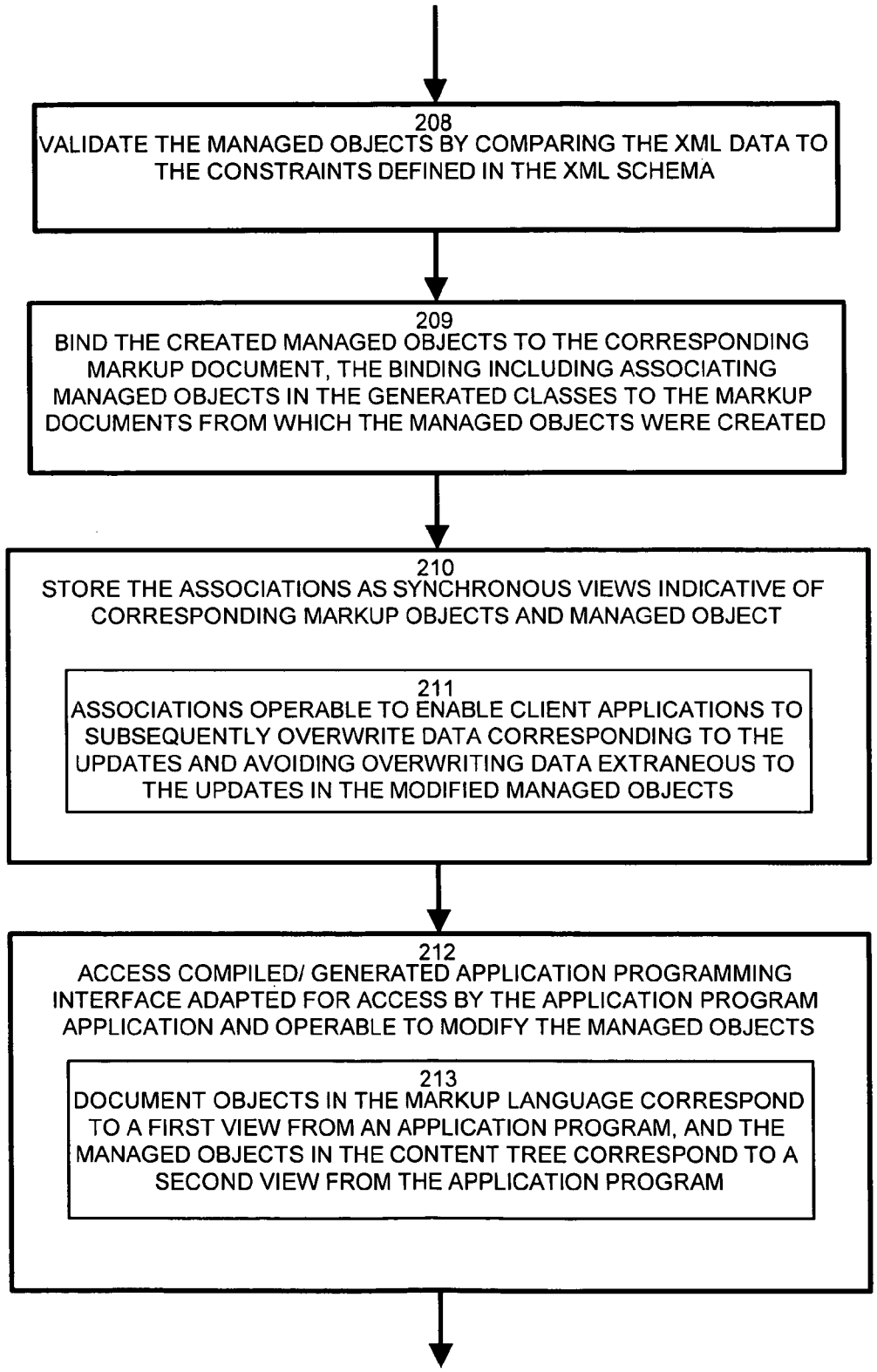
Figure 7:
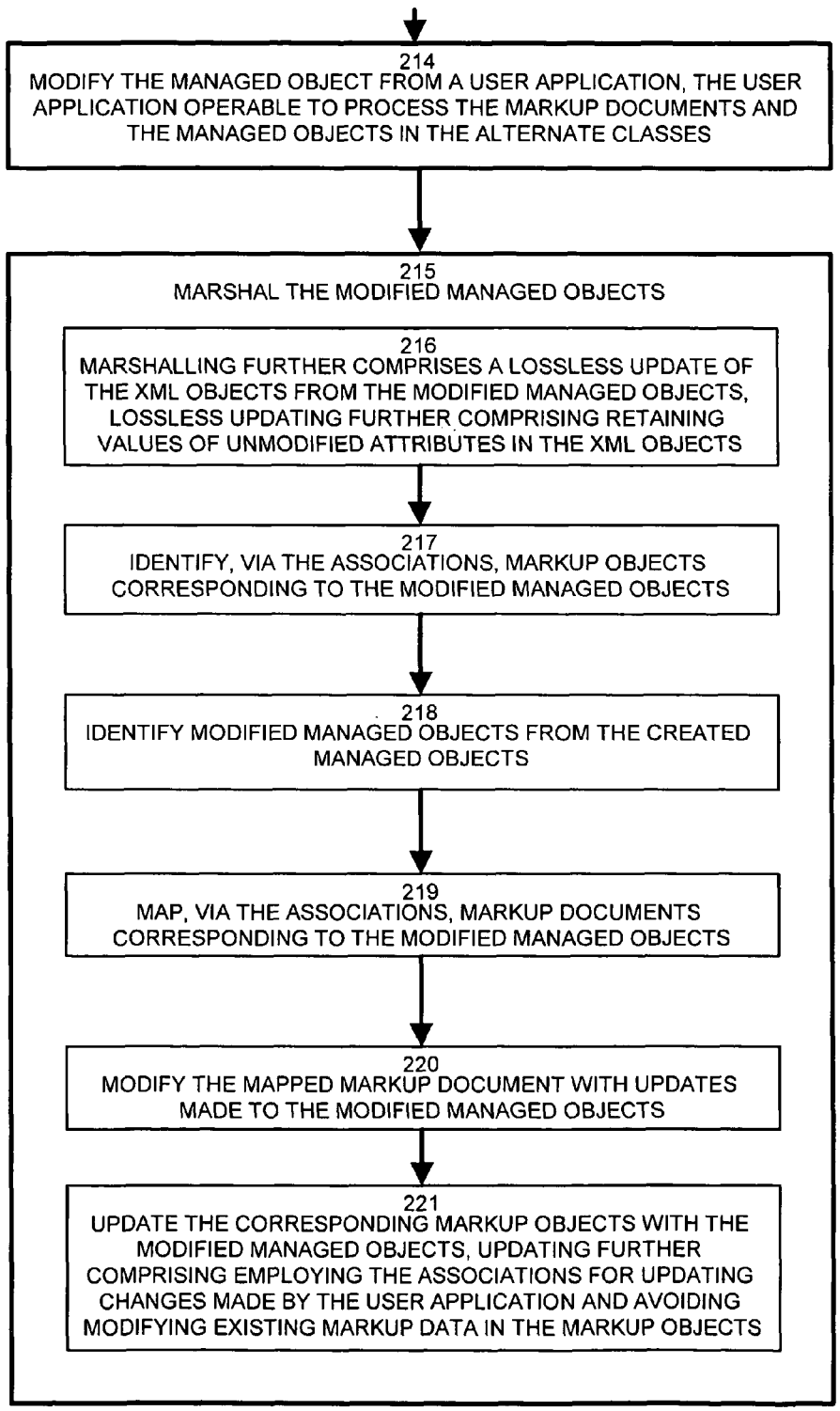

FIGS. 5-7 are a flowchart of object development using the associations of FIG. 4 in the framework of FIG. 2. Referring to FIGS. 2 and 4-7, the binder 120 provides a method of maintaining parallel synchronized views of an object model such as a DOM 110 by identifying markup definitions adapted for synchronous binding via alternate views, as depicted at step 200. A compiler 148 compiles the identified markup definitions to generate alternate classes corresponding to an alternate view, as shown at step 201. In the exemplary configurations, the markup definitions are contained in the schema 118 (from FIG. 2), and the alternate classes are the Java classes 170 used for the JAXB content tree 150 and included objects 130.

In order to manipulate the DOM subtree 116 via the Java class view, the binder 120 unmarshals from the DOM subtree 116 corresponding to the markup definitions, in which the DOM subtree 116 includes the markup data for updating, as shown at step 202. Unmarshalling includes creating managed objects 130 representative of the DOM subtree 116 and conforming to a corresponding one of the generated classes 170. In the exemplary configuration, unmarshalling further includes creating a Java content tree 150 of JAXB managed objects 130 from the DOM 110, in which the managed objects 130 correspond to the DOM subtree 116 as depicted at step 203. Therefore, the DOM subtree 116 defines a first view of data, the managed objects 130 define a second view of the data, and the binding further includes synchronizing updates to the data from at least one of the first view and the second view, in which marshalling further includes creating a markup document consistent with updates from the second view, as shown at step 204.

The source markup documents 160 further define an XML content object tree 114 in the DOM 110, and the resulting associations 122 are indicative of relations between the content tree of managed objects 150 and the objects in the DOM 110, as depicted at step 205. The generated managed objects 130 further define an XML content tree, the content tree having a hierarchical structure derived from the markup definitions (i.e. XML schemas 118), as disclosed at step 206. Accordingly, unmarshalling the document objects 160 in the markup language (XML) to generate the managed objects 130 includes identifying the class structure in the document object model 110 having a set of instances of the document objects 160. The compiler 148 compiles the identified class structure to generate a second class structure, shown as Java classes 170 corresponding to the managed objects 130, as depicted at step 207. Alternatively, in other configurations the JAXB compiler 148 may be bypassed and a developer actually hand-codes the JAXB classes 170 and a Java compiler processes the Java source code and generates the necessary artifacts to support the un/marshal operations.

The unmarshalling operation may also invoke a validator 144 for validating the unmarshalled objects. Accordingly, unmarshalling may also include validating the managed objects 130 by comparing the XML data to the constraints defined in the XML schema 118, as disclosed at step 208. Validation may be beneficial, for example, for accommodating typecasting and/or mismatches which XML allows but which JAXB is sensitive to. In alternative configurations, type validation may also be performed during marshalling back into XML.

The binder 120 identifies the counterpart source XML documents 114 to bind the generated managed objects 130 to the corresponding markup document 116, in which binding includes associating managed objects 130 in the generated classes 170 to the markup documents 116 from which the managed objects 130 were generated, as depicted at step 209. The binder 120 stores the associations 122 as synchronous views indicative of corresponding markup objects 160 and managed objects 130, as shown at step 210. The associations 122 may be stored, such as on a local disk drive or other memory structure operable for retrieval during the marshalling operation, described further below. The associations 122, therefore, are operable to be indicative of subsequent updates to the data in the markup documents 116, as depicted at step 211. Such associations allow later object modifications made by the user code via the JAXB view to be reconciled (i.e. applied) to the XML data. The associations 122 will then allow the subsequent marshalling to only overwrite data corresponding to the updates and avoiding overwriting data extraneous to the updates in the modified managed objects 130, as will be discussed further in the marshalling steps below.

Prior to runtime instantiation of the objects 160, 130 on behalf of the user application 172, the binder 120 further employs the compiler 148 for compiling an application programming interface 174 adapted for access by a user application program 172 and operable to modify the managed objects 130, as shown at step 212. As indicated above, the operations performed by the compiler 148 may be performed anytime prior to runtime object instantiation, and may be discontinuous from user application 172 execution. Such user applications 172 are therefore operable to employ multiple views because the document objects 160 in the markup language correspond to a first view from the application program 172, and the managed objects 130 in the content tree 150 correspond to a second view from the same or another application program 172, as depicted at step 213.

As indicated above, the alternate view provided by the JAXB bound objects 130 provide, in the exemplary configuration, a mechanism to employ Java code for modifying Java objects (i.e. based on Java classes) for XML data originally written and/or stored in XML based on the schemas 118. Accordingly, one or more user applications 172 will modify the managed objects 130 from the user application 172, in which the user application 172 is operable to process the markup documents 160 and the managed objects 130 in the alternate classes (XML and Java), as depicted at step 214.

Following modification and/or revision of the objects 130 in the content tree 150, the user application 172 uses the binder 120 to marshal the modified managed objects 130, as depicted at step 215 thereby synchronizing the parallel views. Marshalling may be viewed as the reverse of the unmarshalling operation, as shown by arrows 141 and 143, wherein marshalling performs a lossless update of the XML objects 160 from the modified managed objects 130, in which lossless updating further includes retaining values of unmodified attributes in the XML objects 160, as shown at step 216. Accordingly, the binder 120 identifies, via the associations 122, markup objects 160 corresponding to the modified managed objects 130, as disclosed at step 217. Identifying the markup objects 116 therefore includes identifying modified managed objects 160 from the generated managed objects 130, as depicted at step 218, such as by flagging modifications on a per attribute or field basis.

The binder 120 maps the identified modifications via the associations 122 to the markup documents 160 corresponding to the modified managed objects 130, as shown at step 219. The binder 120, employing the synchronizer 124 to avoid concurrency conflicts, maps the modified markup documents 160 with updates made to the modified managed objects 130, as depicted at step 219. The binder 120 updates the corresponding markup objects 160 with the mapped updates to the modified managed objects 130, as shown at step 220, in which updating further employs the associations 122 for updating changes made by the user application 172 and avoids modifying existing markup data 180 in the markup objects 160, as depicted at step 221.

Figure 8:
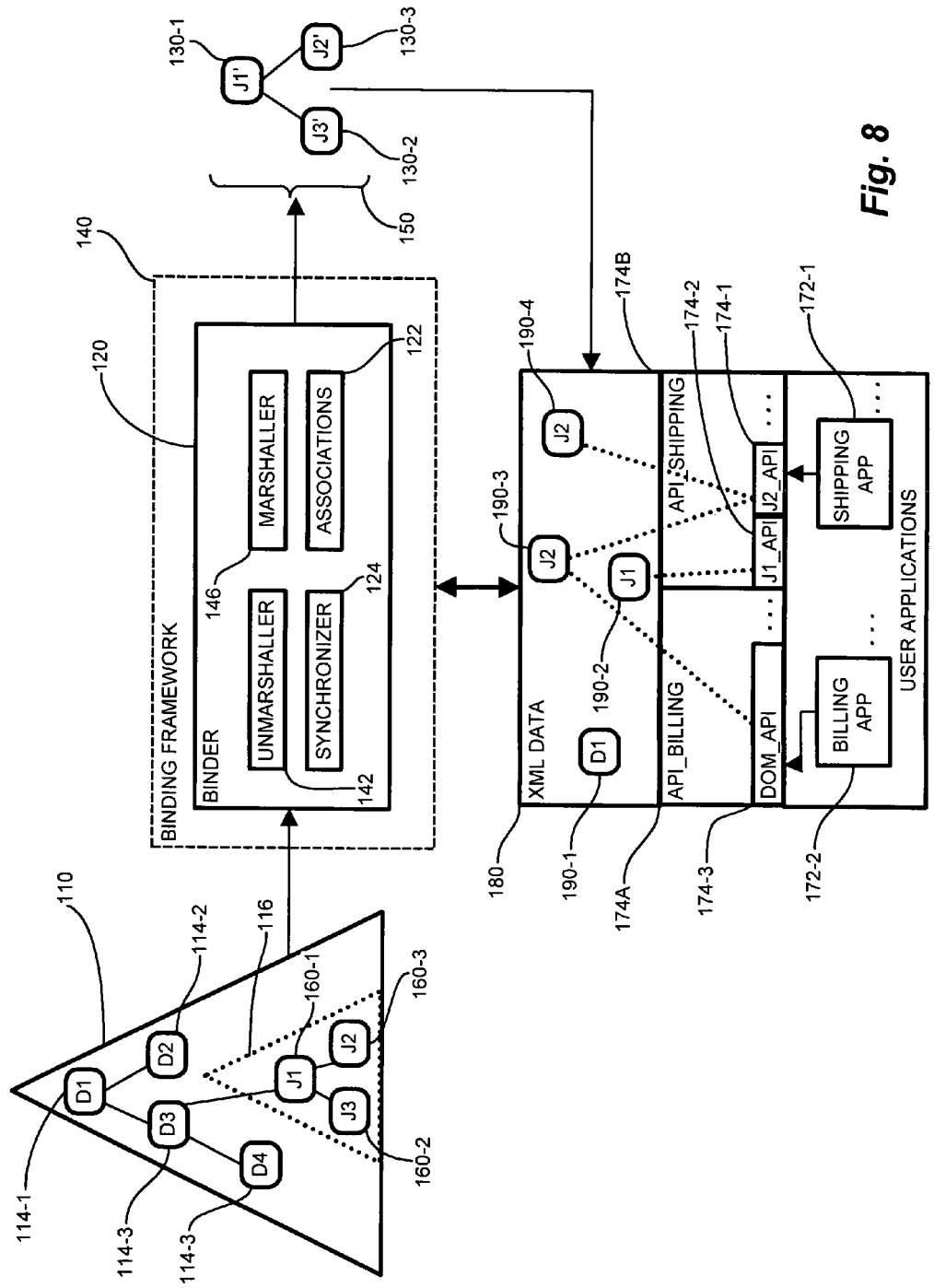
FIG. 8 is a block diagram of runtime operation of bound objects in the binding framework of FIG. 2.

FIG. 8 is a block diagram of runtime operation of bound objects in the binding framework of FIG. 2. Referring to FIGS. 8, 4 and 2, the binding framework 140 is shown in use by user applications 172 accessing XML data 180 via the different views provided by the JAXB 130 objects and the DOM objects 160. As indicated above, the alternate view provided by the JAXB objects allows developers to work with an application 172 using JAXB objects 130, which may be more intuitive and/or less cryptic, than the corresponding XML objects 160. However, multiple applications 172 may need to access the same XML data 180, thus presenting the need for alternate views presented by the DOM 116 and the JAXB objects 130.

In an exemplary configuration shown in FIG. 8, a billing application 172-2 has been developed employing a billing API 174A, that modifies the DOM objects 160 using standard DOM APIs 174-3, and a shipping application 172-1 employs a shipping API 174B, based on JAXB objects 130. The shipping API 174B includes J1_API 174-2 and J2_API 174-1 for accessing the XML data 180 from the J1 and J2 classes, respectively, in the binding of subset 116. The compiler 148 generates the API 174B at some time prior to the marshalling process, as indicated above; the DOM based API 174A uses one of the existing standardized DOM APIs. Therefore, the XML data objects 190 are modifiable from either the shipping application 172-1 or the billing application 172-2 via the associations 122, which employ the synchronizer 124 to coordinate the updates made to the marshaled and unmarshalled objects.

Specifically, the J1_API 174_2 is operable to modify the J1 object 190-2, and the J2_API 174-1 is operable to modify both instantiations of J2 190-3 and 190-4 respectively. Further, the billing DOM_API 174_3 may also modify object 190-3, illustrating the multiple views of object J2. The DOM based (non-unmarshaled) D1 object 190-1, corresponding to DOM object D1 114-1, is likewise modifiable from the DOM_API 174-3 via the billing API 174A. It should be noted that the XML data in the J2 object 190-3 is modifiable from both the J2_API 174-1 interface from the shipping application 172-1, as a JAXB object (view), and from the DOM_API 174-3 interface from the billing application 172-2 via the DOM view. The user application 172 uses the binder 120, therefore, to synchronize the two views in a non-destructive manor.

It should be noted that the exemplary implementation discussed above employs XML based data as exemplary data for modification from multiple (first and second) views. Alternative configurations may employ other scripting languages and/or database repositories. Accordingly, the systems and methods discussed above with respect to the exemplary XML data are applicable to an alternative scripting or processing format or protocol operable for a particular user API.

Those skilled in the art should readily appreciate that the programs and methods for updateable partial binding as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for updateable partial binding has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A computer program product having a computer readable storage medium operable to store computer program logic embodied in computer program code encoded thereon for updateable partial binding comprising:
   computer program code for creating associations between document objects in a markup language and managed objects in a content tree, the document objects corresponding to a class hierarchy structure;
   computer program code for selectively modifying the managed objects; and
   computer program code for updating, by traversing the created associations, the document objects corresponding to the modified managed objects, the updating occurring in a lossless manner which preserves unmodified data in the document objects;
   wherein the document objects in the markup language correspond to a first view from an application program, and the managed objects in the content tree correspond to a second view from the application program;
   wherein creating comprises unmarshalling the document objects in the markup language to create the managed objects, wherein unmarshalling includes identifying a class structure in a document object model having a set of instances of the document objects; compiling the identified class structure to generate a second class structure corresponding to the managed objects; and matching tags and attributes corresponding to the markup language objects to the managed objects.

2. The computer program product of claim 1 further comprising computer program code for compiling an application programming interface adapted for access by the application program and operable to modify the managed objects.

3. The computer program product of claim 2 further comprising computer program code for validating the managed objects against document schema constraints of the document objects.

4. The computer program product of claim 3 wherein the created managed objects further define a content tree, the content tree having a hierarchical structure derived from the markup definitions.

5. The computer program product of claim 4 wherein updating further comprises marshalling, marshalling including a lossless update of the document objects from the modified managed objects, lossless updating further comprising retaining values of unmodified attributes in the document objects.

6. A method of maintaining parallel synchronized views of an object model comprising:
   identifying markup definitions adapted for synchronous binding via alternate views;
   compiling the identified markup definitions to generate alternate classes corresponding to an alternate view;
   unmarshalling markup documents corresponding to the markup definitions, the markup documents including markup data, unmarshalling including instantiating managed objects representative of the markup documents conforming to a corresponding one of the generated classes;

binding the created managed objects to the corresponding markup document, the binding including associating managed objects in the generated classes to the markup documents from which the managed objects were created;

storing the associations as synchronous views indicative of corresponding markup objects and managed objects;

modifying the managed objects from a user application, the user application operable to process the markup documents and the managed objects of the alternate classes;

marshalling the modified managed objects, marshalling further comprising:

identifying, via the associations, markup objects corresponding to the modified managed objects; and updating the corresponding markup objects with the modified managed objects, updating further comprising employing the associations for updating changes made by the user application and avoiding modifying existing markup data in the markup objects.

7. The method of claim 6 wherein unmarshalling further comprises creating a content tree of managed objects from the markup documents, the managed objects corresponding to the markup definitions.

8. The method of claim 7 wherein identifying the markup objects further comprises:

identifying modified managed objects from the created managed objects;

mapping, via the associations, markup documents corresponding to the modified managed objects; and modifying the mapped markup document with updates made to the modified managed objects.

9. The method of claim 8 wherein the associations are indicative of updates to the data in the markup documents, the marshalling further comprising overwriting data corresponding to the updates and avoiding overwriting data extraneous to the updates in the modified managed objects.

10. The method of claim 9 wherein the marshalling further comprises a lossless update of the XML objects from the modified managed objects, lossless updating further comprising retaining values of unmodified attributes in the XML objects.

11. The method of claim 10 wherein the markup documents comprise a first view of data, the managed objects comprise a second view of the data, the binding further comprising synchronizing updates to the data from at least one of the first view and the second view, the marshalling further comprising creating a markup document consistent with updates from the second view.

12. The method of claim 11 wherein the markup documents further define an XML content object tree, and associating is indicative of relations between the content tree of managed objects and the objects in the XML content object tree.

13. A data processing device for updateable partial binding of software objects comprising:

a binder operable to identify markup definitions adapted for synchronous binding via alternate views, the binder further comprising:

an unmarshaller operable to create associations between document objects in a markup language and managed objects in a content tree, the document objects corresponding to a class hierarchy structure defined by the markup definitions;

a compiler operable to compiling the identified markup definitions to generate alternate classes corresponding to an alternate view, the compiler further operable to generate an application programming interface for selectively modifying the managed objects from user code; and a marshaller operable to update, by traversing the created associations, the document objects corresponding to the modified managed objects, the updating occurring in a lossless manner which preserves unmodified data in the document objects;

wherein the unmarshaller is further operable to create a content tree of managed objects from the markup documents, the managed objects corresponding to the markup definitions;

wherein the marshaller is further operable to:

identify modified managed objects from the created managed objects;

map, via the associations, markup documents corresponding to the modified managed objects; and modify the mapped markup document with updates made to the corresponding modified managed objects.

14. The data processing device of claim 13 wherein the associations are indicative of updates to the data in the markup documents, the marshalling further comprising overwriting data corresponding to the updates and avoiding overwriting data extraneous to the updates in the modified managed objects.

15. The data processing device of claim 14 wherein the markup documents are XML objects which define an XML content object tree, the managed objects are JAXB objects in a JAXB content tree, and the associations are indicative of relations between the content tree of managed objects and the objects in the XML content object tree, wherein the marshaller is further operable to perform a lossless update of the XML objects from the modified managed objects, lossless updating further comprising retaining values of unmodified attributes and nodes in the XML objects.

* * * * *